(12) United States Patent
Patil et al.

(10) Patent No.: US 7,690,512 B1
(45) Date of Patent: Apr. 6, 2010

(54) SYSTEM AND METHOD FOR PROCESSING SHREDDED VEGETABLES

(75) Inventors: Narayan Dnyanadeo Patil, King City, CA (US); Andrew Dave Fernandez, Salinas, CA (US); Seth Marcus Goldsmith, Monterey, CA (US); Edward James Wynn, Monterey, CA (US)

(73) Assignee: Dole Fresh Vegetables, Inc., Monterey, CA (US)

( * ) Notice: Subject to any disclaimer, the term of this patent is extended or adjusted under 35 U.S.C. 154(b) by 990 days.

(21) Appl. No.: 10/683,538

(22) Filed: Oct. 10, 2003

(51) Int. Cl.
*B07B 1/00* (2006.01)
*B07B 13/16* (2006.01)

(52) U.S. Cl. .................. 209/241; 209/235; 209/245; 209/247; 209/313; 209/325; 99/538

(58) Field of Classification Search ............ 209/241, 209/243, 313, 320, 325, 353, 247, 245, 235; 99/538
See application file for complete search history.

(56) References Cited

U.S. PATENT DOCUMENTS

| 2,130,880 | A | * | 9/1938 | Durning | 131/312 |
| 3,612,124 | A | | 10/1971 | Cunningham et al. | |
| 3,905,897 | A | * | 9/1975 | Jacobson | 209/405 |
| 4,036,123 | A | * | 7/1977 | Conkey | 99/538 |
| 4,453,458 | A | * | 6/1984 | Altman | 99/544 |
| 4,581,990 | A | * | 4/1986 | Matsumoto | 99/538 |
| 5,507,396 | A | * | 4/1996 | Hauch | 209/399 |
| 5,727,690 | A | * | 3/1998 | Hofmeister | 209/139.1 |

* cited by examiner

*Primary Examiner*—Patrick Mackey
*Assistant Examiner*—Terrell H Matthews
(74) *Attorney, Agent, or Firm*—Morrison & Foerster LLP

(57) ABSTRACT

In a system to separate shredded vegetable pieces, a slicer cuts a vegetable having leaves and a core into pieces to form a mixture of leaf and core pieces. The mixture then passes through a sorting mechanism that separates the core pieces from the mixture.

7 Claims, 2 Drawing Sheets

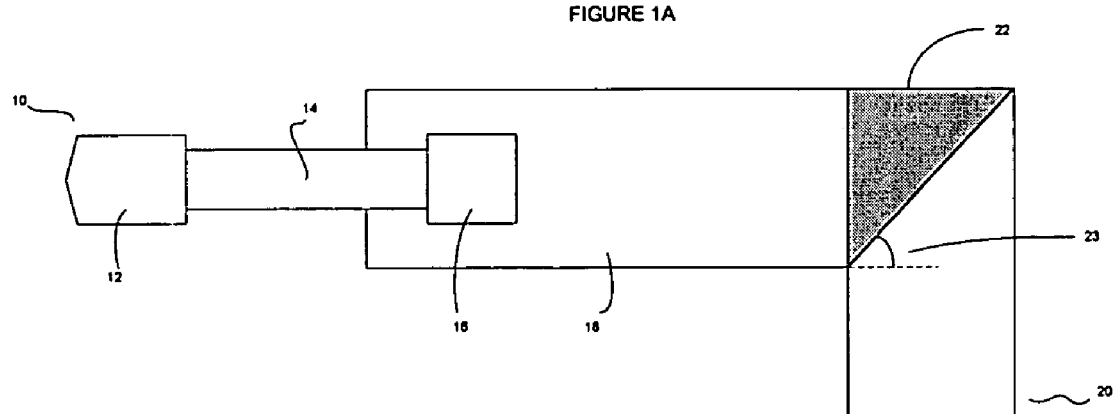
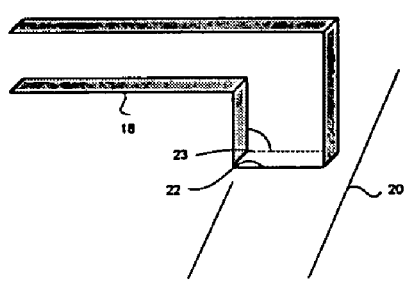

SYSTEM AND METHOD FOR PROCESSING SHREDDED VEGETABLES

FIELD OF THE INVENTION

This application relates to the mechanical processing of shredded vegetables. Specifically, a system and method for removing cabbage core pieces from leaf pieces after shredding the whole cabbage head is provided.

BACKGROUND OF THE INVENTION

Packaged, pre-shredded vegetables, such as cabbages, have been processed and marketed for many years. Due to the hard and undesirable texture of the cabbage core, the process for commercially preparing shredded cabbage involves coring the cabbage before shredding the head (i.e., the leaves). Coring is typically accomplished manually using hand-held coring rings or blades. In general, the manual coring process is considered inefficient and labor intensive. In addition, if the whole cabbage is cored in the field, the cored area becomes exposed, subjecting that area to the potential risk of contamination and degradation during transport for subsequent processing.

SUMMARY OF THE INVENTION

In one exemplary embodiment, a system for separating shredded vegetable pieces includes a slicer configured to cut a vegetable having a leaf portion and a core portion into a plurality of pieces of said leaf and core portions to form a mixture of leaf pieces and core pieces. The system also includes a sorting mechanism adapted to separate core pieces from the mixture.

BRIEF DESCRIPTION OF THE DRAWINGS

FIG. 1A is a top view of the system involved in the separation process of vegetable pieces.

FIG. 1B is a side view of the conveyor end having a bias angle of 90°.

DETAILED DESCRIPTION OF THE INVENTION

Figure 2A:
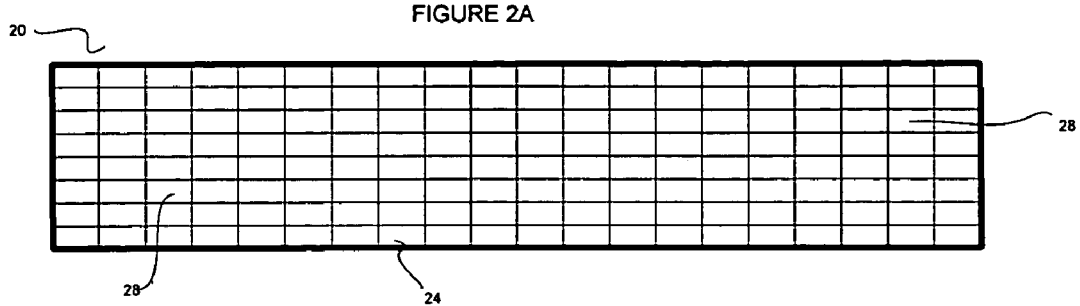
FIG. 2A is a top view of a sorting mechanism screen having rectangular apertures.

In one exemplary embodiment, core pieces from a mixture of cabbage core and leaf pieces are separated after the cabbage has been shredded. As used herein, the term "shredded" includes all types of cutting, e.g., slicing, dicing, and mincing. The process starts by transporting whole raw cabbage heads in bins from the field, cooling them to remove field heat, storing them in a cold raw material warehouse, and staging them onto a bin dumper for delivery to a feed hopper and then to trim line conveyors. Process line inspectors then manually remove any damaged or defective wrapper leaves. Inspected and suitable heads having leaf and core portions from the trim line conveyors are then collected for further processing.

With reference to FIG. 1A, suitable cabbage heads are processed by exemplary system 10. In system 10, cabbage heads from bin dumper 12 are transported on a trim line conveyer belt 14 and fed into a slicer 16 that is anchored on top of a vibratory feed shaker 18. Slicer 16 may be, e.g., Commercial Slicer Model NS (Commercial Slicer Company, Waterloo, N.Y.), but any type of commercially available cabbage cutting device can be used. The slicer 16 is equipped with a blade assembly and set to cut the cabbage to a specific length and thickness. For example, it may be desired to shred the cabbage to a length of about 2.5 cm to about 7.6 cm (about 1 inch to about 3 inches) and a thickness of about 0.2 cm to about 0.6 cm (about ¹⁄₁₆ inch to about ¼ inch).

The slicer 16 produces a mixture of shredded cabbage that contains leaf pieces and core pieces. After cutting, the mixture of leaf and core pieces falls onto the vibratory feed shaker 18. The vibratory feed shaker 18 transports the shredded mixture to the sorting mechanism 20. The vibratory motion of the feed shaker 18 facilitates disruption of any clumps in the mixture and promotes uniform distribution of the mixture on the feed shaker 18.

In another embodiment, the slicer 16 is mounted on the sorting mechanism 20 such that the leaf and core pieces are directly delivered from the slicer 16 to the sorting mechanism 20 after shredding. In yet another embodiment, the slicer 16 is anchored on the floor and discharges leaf and core pieces onto a conveyor. The conveyor then transports the mixture of leaf and core pieces to a vibratory feed shaker 18. The feed shaker 18 then transports the shredded mixture to the sorting mechanism 20. Alternatively, system 10 can include one or more intermediate processing stations between slicer 16 and sorting mechanism 20. As such, system 10 can include one or more additional conveyors to transport the mixture to the one or more intermediate processing stations.

Referring back to FIG. 1A, the mixture continues to move from the feed shaker 18 through the feed shaker end 22 to sorting mechanism 20. The feed shaker end 22 may form a bias angle 23 with the sorting mechanism 20. The bias angle 20 may be configured to be about 0° to about 90° or more, or about 45° to about 90°, but in some instances, a non-bias feed arrangement may be appropriate. For example, the feed shaker 18 may be lined up in a straight line with the sorting mechanism 20.

A clearer view of the feed shaker end 22 and bias angle 23 is depicted in FIG. 1B. In FIG. 1B, a side view of the conveyor end 22 is shown to be at a bias angle of 90° to the sorting mechanism 20. Feeding of the mixture between about a 45° to about 90° bias angle helps to minimize formation of product lumps and dead or static zones, and provide a uniform layer of the shredded cabbage mixture on the sorting mechanism 20. This uniform distribution of mixture with minimal lump formation increases the efficiency of separation of core pieces from the mixture when the mixture contacts (and is further processed by) the sorting mechanism 20.

Figure 2B:
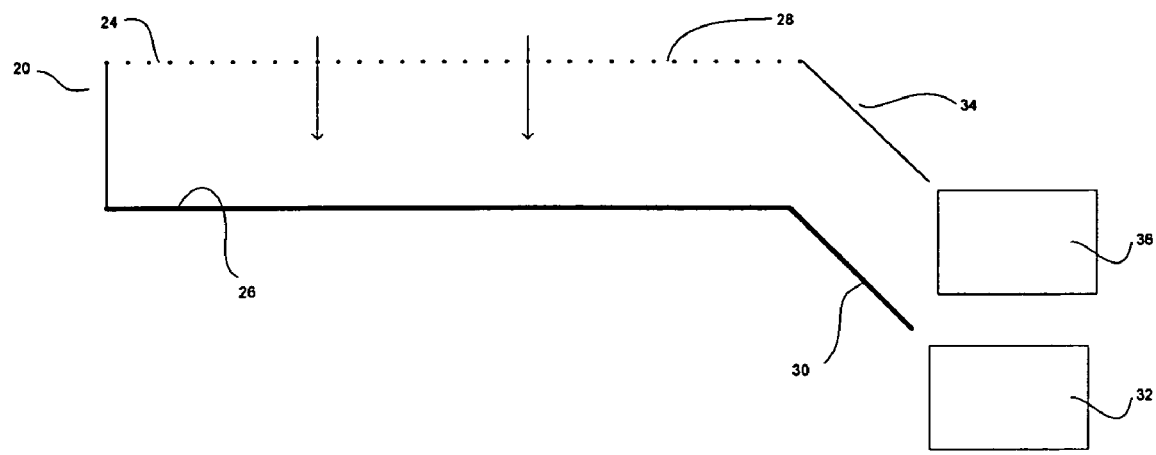
FIG. 2B is a side view of the sorting mechanism showing its bi-leveled configuration. Vegetable leaf pieces on the screen(s) are separated from core pieces when they fall through the screen apertures onto the collection pan.

Sorting mechanism 20 separates a substantial amount of the cut core pieces from the mixture of leaf and core pieces. As shown in FIGS. 2A-2B, sorting mechanism 20 includes one or more screens 24 (i.e., one long screen or a series of screens) that vibrate and a non-perforated stationary collection pan 26 underneath. It may be desirable for the sorting mechanism 20 to include a series of screens, e.g., for ease of maintenance and cleaning of the sorting mechanism. In some instances, the series of screens may include at least four screens. In FIG. 2A, the one or more screens 24 contain a plurality of apertures 28. The apertures 28 reside in a mesh-like material formed by metal or polymeric wires, or other natural or synthetic fibers, threads, or cords.

The apertures 28 may be of any shape and size, so long as they separate leaf pieces from the mixture of core and leaf pieces, and separate them so that they are of the desired cut size. In one embodiment, the apertures 28 are rectangles that are about 2.5 cm (1 inch) long and about 1.6 cm (about 5/8 inch) wide. These dimensions may be desirable for separation of pieces that have a length of about 2.5 cm to about 7.6 cm (about 1 inch to about 3 inches) and a thickness of about 0.2 cm to about 0.6 cm (about 1/16 inch to about 1/4 inch).

Although the apertures 28 are depicted as rectangles in FIG. 2A, as mentioned above, other aperture shapes such as ovals, ellipses, squares, trapezoids, triangles, parallelograms, circles, cones, and the like, can be used. For example, the dimensions of a parallelogram shaped aperture may be about 2.5 cm (1 inch) long and 1.6 cm (5/8 inch) wide, and for square apertures, about 2.5 cm (1 inch) long and 2.5 cm (1 inch) wide. Additionally, the screens 24 may each be configured to have apertures of different dimensions. In one exemplary embodiment, for a series of four screens, three screens may have rectangular apertures measuring about 2.5 cm (about 1 inch) long and about 1.6 cm (about 5/8 inch) wide starting at the infeed end of the sorting mechanism 20, and one screen may have square apertures of about 1.9 cm (about 3/4 inch) in length and width at the discharge end of the sorting mechanism 20. In another exemplary embodiment, for a series of four screens, one screen may have square apertures measuring about 1.9 cm (about 3/4 inch) in length and width at the infeed end of the sorting mechanism, and three screens may have square apertures measuring about 2.5 cm (about 1 inch) in length and width at the discharge end of the sorting mechanism. In essence, the number of screens having apertures of different shapes and/or sizes, and the sequence of screens having apertures of different shapes and/or sizes from the infeed to the discharge end of the sorting mechanism may be interchanged as desired to maximize sorting efficiency and/or cut size of the product.

As depicted in FIG. 2B, after the shredded cabbage mixture is fed to the sorting mechanism 20, the vibratory motion of the screen(s) 24 promotes passage of the leaf pieces through the screen apertures 28 into collection pan 26 (in the direction of the arrows). The frequency and amplitude of vibration of the screen(s) will generally vary depending on the specific characteristics of the sorting mechanism, but will typically be adjusted so that the mixture does not bounce off, or spill out from, the screen(s).

The leaf pieces in the collection pan 26 pass through chute 30 to a first collection tank 32, from which further downstream processing (washing, drying, and packaging of leaf pieces) occurs. The core pieces that remain on the screen(s) 24 are channeled by a separate chute 34, to a second collection tank 36. The collected core pieces may then be discarded or recycled through the sorting mechanism 20 to recover additional leaf pieces that may have remained with the core pieces.

The efficient separation of core pieces from the mixture is dependent upon many adjustable parameters, some of which have already been described. For example, efficient separation is generally dependent upon one or more of the following: 1) screen aperture size and shape; 2) product cut size; 3) distribution pattern and depth of the shredded mixture on the feed shaker and sorting mechanism screen(s); 4) feedrate onto the feed shaker and the sorting mechanism screen(s); 5) residence time of the shredded mixture on the screen(s); 6) length of the sorting mechanism screen(s); and 7) the frequency and amplitude of vibration of the screen(s). However, the separation system and method will generally separate a substantial amount of core pieces from the mixture, e.g., at least about 75%, at least about 80%, at least about 85%, at least about 90%, at least about 95%, or at least about 99% or more of core pieces from the mixture. In addition to separating core pieces from leaf pieces, it may also be desirable to obtain leaf pieces of a predetermined size (screen yield). This separation system and method is also designed to optimize screen yield as well as maximize separation efficiency.

Although the mechanical process of separating cabbage core pieces from a mixture of core and leaf pieces has been described, the system and method may also be applied to the shredding of other leafy vegetables having cores such as iceberg lettuce.

The following examples describe systems and methods for separating cabbage core pieces from leaf pieces after shredding. It should be noted, however, that other slicers and sorting mechanism parameters may be used in like manner.

Example 1

Green cabbages with leaf and core portions are cut by a slicer (Commercial Slicer, Model NS with 26" blade assembly) set to produce pieces of about 2.5 cm to about 7.6 cm (about 1 inch to about 3 inches) in length and about 0.2 cm to about 0.6 cm (about 1/16 inch to about 1/4 inch) in thickness. The resulting mixture of leaf and core pieces is then fed onto a sorting mechanism having four screens with rectangular apertures measuring 2.5 cm (1 inch) in length and 1.6 cm (5/8 inch) in width. Each screen is 61 cm (2 feet) long and 91 cm (3 feet) wide, and has a federate of between about 227 kg/hr to about 273 kg/hr (about 500 lbs/hr to about 600 lbs/hr).

Approximately 96.5% to 99.3% or more of core pieces are then separated from the mixture using the above parameters. Screen yield is then about 70% to about 75% or more.

Example 2

Green cabbages with leaf and core portions are cut by a slicer (Commercial Slicer, Model NS with 26" blade assembly) set to produce pieces of about 2.5 cm to about 7.6 cm (about 1 inch to about 3 inches) in length and about 0.2 cm to about 0.6 cm (about 1/16 inch to about 1/4 inch) in thickness. The resulting mixture of leaf and core pieces is then fed onto a sorting mechanism having three screens starting at the infeed end of the sorting mechanism with apertures measuring 2.5 cm (1 inch) long and 1.6 cm (5/8 inch) wide, and one screen at the discharge end of the sorting mechanism with apertures measuring 1.9 cm (3/4 inch) in length and width.

Each screen is 61 cm (2 feet) long and 91 cm (3 feet) wide, and has a federate of between about 227 kg/hr to about 273 kg/hr (about 500 lbs/hr to about 600 lbs/hr).

Approximately 99.6% or more of core pieces are then be separated from the mixture using the above parameters. Screen yield is then be about 75% to about 80% or more.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit and scope of the appended claims.

The invention claimed is:

1. A mechanical method for separating shredded vegetable pieces comprising:
    a) providing a vegetable having a leaf portion and a core portion;
    b) cutting the leaf and core portions into a plurality of leaf pieces and core pieces to form a mixture of leaf and core pieces;
    c) feeding the mixture to a sorting mechanism having an infeed end, a discharge end, and one or more screens, wherein the one or more screens have a plurality of screen apertures; and
    d) separating core pieces form the mixture based on their dimensions using the one or more screens.

2. The mechanical method of claim 1 wherein the plurality of screen apertures are rectangular in shape.

3. The mechanical method of claim 2 wherein the rectangular apertures measure about 2.5 cm (about 1 inch) in length to about 1.6 cm (about 5/8 inch) in width.

4. The mechanical method of claim 1 wherein the one or more screens comprises a series of screens having a plurality of apertures between the infeed end and the discharge end, and wherein the apertures of one or more screens differ in shape and size from the apertures of other screens in the series.

5. The mechanical method of claim 1 wherein the step of separating comprises passing leaf pieces through the apertures into a collection pan, and thereafter, into a first tank, and channeling core pieces that remain on the one or more screens to a second tank.

6. The mechanical method of claim 1 further comprising the step of packaging the mixture without the core pieces.

7. The mechanical method of claim 1 wherein the vegetable is a cabbage.

* * * * *